(12) United States Patent
Ruether et al.

(10) Patent No.: US 7,886,451 B2
(45) Date of Patent: Feb. 15, 2011

(54) INTEGRAL ELECTRODE TILT SENSOR AND METHOD FOR MAKING SAME

(75) Inventors: Andrew Ruether, Wallingford, PA (US); Joseph J. Seipp, Jr., Levittown, PA (US)

(73) Assignee: The Fredericks Company, Huntingdon Valley, PA (US)

( * ) Notice: Subject to any disclaimer, the term of this patent is extended or adjusted under 35 U.S.C. 154(b) by 100 days.

(21) Appl. No.: 12/380,865

(22) Filed: Mar. 4, 2009

(65) Prior Publication Data

US 2009/0260242 A1 Oct. 22, 2009

Related U.S. Application Data

(60) Provisional application No. 61/068,190, filed on Mar. 5, 2008.

(51) Int. Cl.
*G01C 9/06* (2006.01)
(52) U.S. Cl. .................... 33/366.21; 33/366.11
(58) Field of Classification Search ............. 33/366.11, 33/366.15, 366.21, 366.22
See application file for complete search history.

(56) References Cited

U.S. PATENT DOCUMENTS

| | | | |
|---|---|---|---|
| 2,713,726 A | 7/1955 | Dixson | |
| 3,487,303 A | 12/1969 | Remington | |
| 3,823,486 A | 7/1974 | Bhat et al. | |
| 4,660,290 A * | 4/1987 | Hori et al. | 33/366.19 |
| 4,672,753 A * | 6/1987 | Kent et al. | 33/366.19 |
| 5,079,847 A * | 1/1992 | Swartz et al. | 33/366.12 |
| 5,170,567 A | 12/1992 | Davis et al. | |
| 5,630,280 A | 5/1997 | Crossan, Jr. | |
| 6,032,375 A * | 3/2000 | Shijo et al. | 33/366.21 |
| 6,123,866 A * | 9/2000 | Shijo | 33/366.15 |
| 6,247,239 B1 * | 6/2001 | Shijo et al. | 33/366.11 |
| 6,249,984 B1 | 6/2001 | Barsky et al. | |
| 6,282,804 B1 * | 9/2001 | Jiang | 33/366.21 |
| 6,505,409 B2 * | 1/2003 | Toda et al. | 33/366.24 |
| 6,688,013 B2 | 2/2004 | Greway | |
| 2006/0107540 A1 * | 5/2006 | Fabian | 33/366.15 |

\* cited by examiner

*Primary Examiner*—G. Bradley Bennett
(74) *Attorney, Agent, or Firm*—Dilworth & Barrese, LLP

(57) ABSTRACT

Fabrication methods are provided for an electrolytic tilt sensor which includes a containment envelope defining an interior space; at least first and second electrodes disposed along, and in contact with, a first interior surface portion of the containment envelope, said first and second electrodes being spaced apart from each other to define a gap between respective opposing edges of the first and second electrodes; at least a third electrode disposed along and in contact with a second interior surface portion of the containment envelope opposite said first interior surface portion; an electrolyte solution at least partially filling the interior space of the containment envelope to provide a bubble; and means for hermetically sealing the containment envelope.

25 Claims, 8 Drawing Sheets

INTEGRAL ELECTRODE TILT SENSOR AND METHOD FOR MAKING SAME

CROSS-REFERENCE TO RELATED APPLICATIONS

This application claims priority to U.S. Provisional application Ser. No. 61/068,190 filed Mar. 5, 2008 to which priority is claimed and which is herein incorporated by reference.

BACKGROUND

1. Field of the Invention

The present invention relates generally to electrochemical devices and, in particular, to an electrolytic tilt sensor and a method for making same.

2. Background of the Art

Electrolytic tilt sensors were originally conceived for weapons delivery and aircraft navigation and are now used in applications such as oil rig leveling, bore-hole angling, construction laser systems, marine stabilization, automotive wheel alignment, seismic and geophysical monitoring, virtual reality systems, and robotic manipulators, etc.

Electrolytic tilt sensors provide output voltage proportional to tilt angle and a phase indicative of tilt direction when configured in an appropriate electrical circuit. An electrolytic tilt sensor typically includes a glass envelope or non-conductive housing that is partially filled with an electrolytic solution, and a plurality of conductive electrodes, including one common electrode, which are at least partially immersed in the electrolytic solution. A portion of the cell which remains unfilled defines a gaseous bubble, which shifts as the cell is tilted, also causing the electrolyte to shift. Consequently, the electrodes become more or less immersed by the electrolyte as the bubble shifts. This shift provides a change in electrode coverage area which results in impedance change between any one electrode and the common electrode. When the tilt sensor electrodes are configured as part of an appropriate electrical circuit, the angle of tilt may be correlated to an output voltage of the circuit.

The geometric configuration of the enclosure and the arrangement and shape of the electrodes affect the quality and performance of each tilt sensing device, including linearity and sensitivity of the output signal. Various geometric configurations of enclosures of these devices have been disclosed in the prior art; for example, U.S. Pat. No. 2,713,726 discloses a rectangular enclosure; U.S. Pat. No. 3,487,303 discloses a spherical housing; U.S. Pat. No. 3,823,486 discloses a housing having a toroidal configuration; and U.S. Pat. No. 5,170,567 discloses a cylindrical housing.

A conventional electrolytic tilt sensor for use in a relatively narrow operating range (i.e., "narrow angle" tilt sensor) is illustrated in FIG. 1. The narrow angle tilt sensor 10 includes a tubular or "banana shaped" glass envelope housing 12, active electrodes 14a, 14b and common electrode 14c extending into the interior of the envelope 12, an electrolytic solution 16 surrounding at least a portion of the electrodes 14a, 14b and all of common electrode 14c, and a vapor bubble 20. There is typically a hermetic seal between the envelope and the electrodes, so that the electrolytic solution and the vapor bubble remain completely within the envelope.

The vessel configuration, electrolyte, electrode arrangement and number of electrodes may be varied to provide the desired operating characteristic. The electrodes may be comprised of platinum, and the electrolyte may be a solution of potassium iodide dissolved in ethanol. The curvature M of the housing may determine the operating and sensitivity range of the device. Alternating current ("AC") is applied to electrolytic tilt-sensors. FIGS. 2 and 2A show two alternative typical electrical circuits to be used with his tilt sensor.

Known shortcomings associated with conventional envelope tilt sensors include difficulties in manufacturing the sensor. Moreover, tilt sensor manufacture requires a significant degree of skill, fixturing, and labor intensive handwork and art on the part of the operator to achieve the desired parameters. The tolerances of the glass housings during the process can vary greatly. This results in either a higher reject rate and/or a greater range of mechanical and electrical tolerance in the parts. In addition, the tilt sensor components are relatively fragile due to their glass construction and must be handled with caution. They are also costly to manufacture and generally use precious metal electrodes.

Electrolytic tilt sensors with conductive envelopes, such as metallic or partially metallic envelopes, have been disclosed in the prior art (see, for example U.S. Pat. No. 5,630,280 to Crossan, Jr. and U.S. Pat. No. 6,249,984 to Barsky, et al.). The Crossan, Jr. tilt sensor (U.S. Pat. No. 5,630,280) includes four arcuate sensing electrodes extending into a spherical chamber defined by the enclosure. The enclosure includes a metallic containment housing and a header made of a non-conductive material, such as glass. The metallic containment housing functions as the common electrode while the header secures the sensing electrodes and insulates them from the metallic containment vessel.

The Crossan, Jr. tilt sensor is for use in a wide operating ranges and provides certain advantages, such as enhanced linearity of output voltage resulted from arcuate electrodes in association with the spherical chamber.

The tilt sensor disclosed in Barsky, et al. (U.S. Pat. No. 6,249,984), the entire contents of which are herein incorporated by reference, includes a metallic envelope, a metal header welded to the envelope, and a plurality of electrodes located within the envelope. Each of the electrodes has a general straight configuration and is vertically mounted through the header while they are insulated by glass to metal seals. Similar to Crossan, Jr., this tilt sensor is also for use in a relative wide range of tilt angle.

SUMMARY

An electrolytic tilt sensor is provided herein which comprises (a) a containment envelope defining an interior space; (b) at least first and second electrodes disposed along, and in contact with, a first interior surface portion of the containment envelope, said first and second electrodes being spaced apart from each other to define a gap between respective opposing edges of the first and second electrodes; (c) at least a third electrode disposed along and in contact with a second interior surface portion of the containment envelope opposite said first interior surface portion; (d) an electrolyte solution at least partially filling the interior space of the containment envelope to provide a bubble; and (e) means for hermetically sealing the containment envelope.

The tilt sensor of the present invention is functionally equal to, or better than the prior art sensors, while being easier and cheaper to fabricate.

BRIEF DESCRIPTION OF THE DRAWINGS

Various embodiments are described below with reference to the drawings wherein.

DETAILED DESCRIPTION OF PREFERRED EMBODIMENT(S)

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "precious metal" as used herein refers to Group VIII metals (Ru, Rh, Pd, Os, Ir, Pt) as well as gold and silver.

The former state-of-the-art designs require a highly trained glass technician to use laborious alignment procedures. Costly platinum wires, used as leads and electrodes, are fixedly positioned in a glass vessel. In contrast, the present invention preferably uses rhodium gold, platinum, silver and/or alloys thereof, in films (deposited from resinate solutions) or inks or frit coatings which are deposited onto the inside surface of a curved glass tube containment vessel to form the electrodes. Optionally, metals such as iron, nickel and chromium can also be used. The applied films are significantly less expensive than the platinum or other precious metal wire. Perfect alignment is achieved using a laser cutting technique. This invention methodology is conducive to automation. Thus, limited skilled operators can carry out the necessary work to fabricate a tilt sensor, which is considerably less expensive, from both a material cost and labor cost point of view. Further, even though the fabrication cost is reduced the product of this invention provides much better performance. This improvement in performance can be attributed at least in part to the lower profile and increased accuracy of alignment of the electrodes, resulting from the precision laser cut. The parallel position of the electrodes on the vial walls is much better than wire electrodes. Finally, the tilt sensor is made of non-magnetic materials, which is advantageous in some applications such as leveling of gyroscopes.

Figure 1:
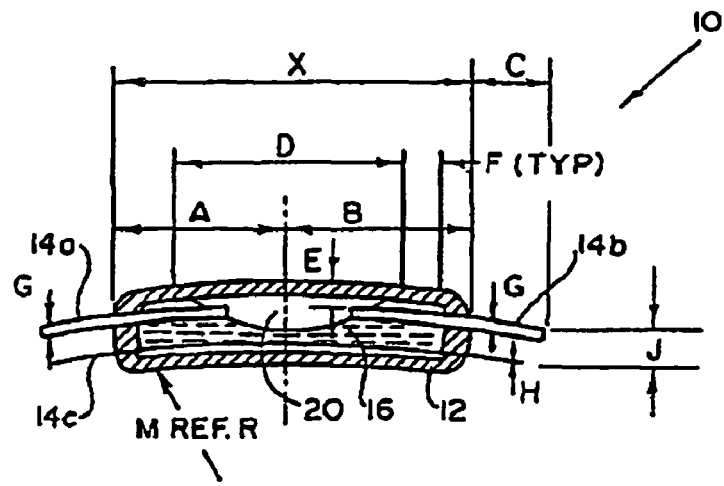
FIG. 1 is a cross-sectional view of a conventional electrolytic tilt sensor.
Figure 2:
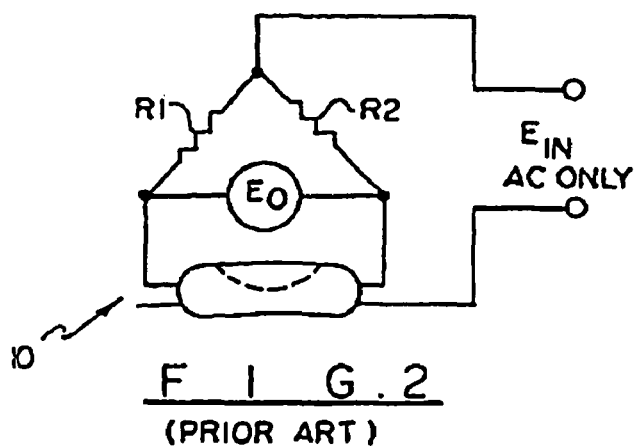
FIGS. 2 and 2A are electrical circuits incorporating the tilt sensor of FIG. 1.
Figure 2A:
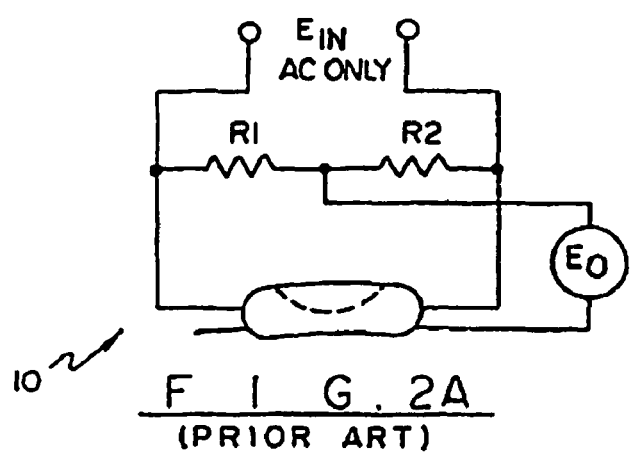
Figure 3:
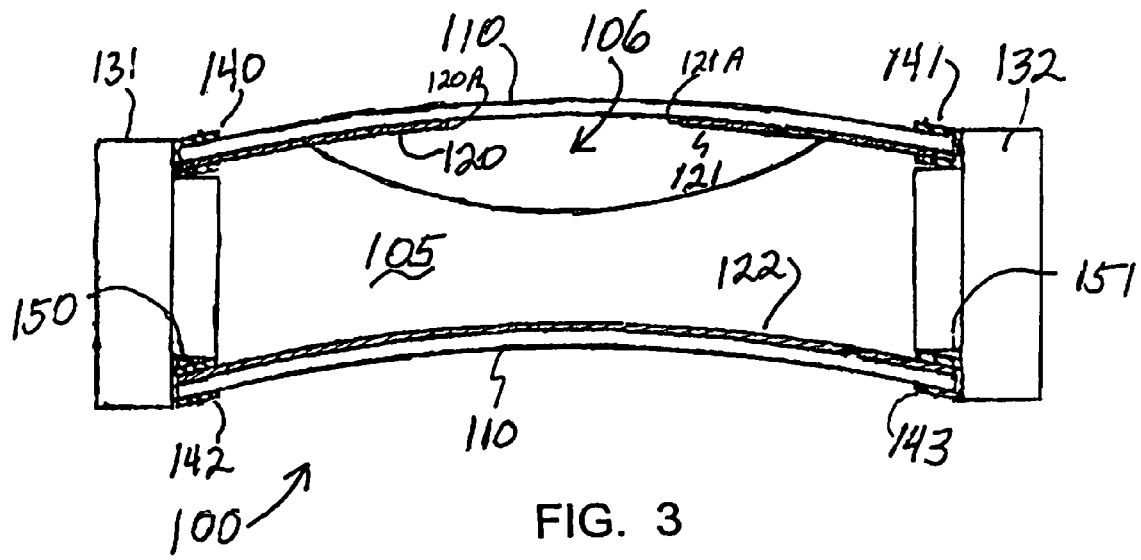
FIG. 3 is a diagrammatic illustration of the electrolytic tilt sensor of the invention.
Figure 4:
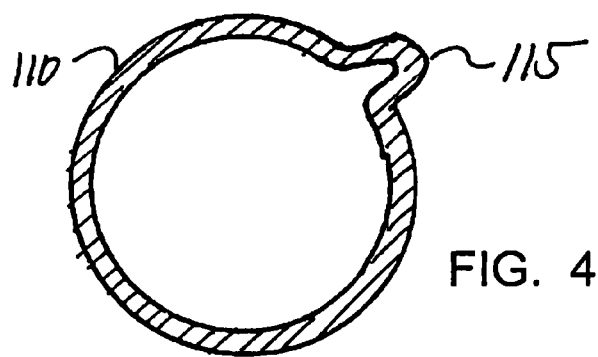
FIG. 4 is a sectional view of the glass containment vessel with a pour spout.

Referring to FIG. 3 the electrolytic tilt sensor 100 of the present invention has a glass containment envelope, or vessel, prepared from a curved glass tube 110 optionally having a filling spout 115. Conductive termination pads 140, 141, 142, 143, to which termination leads can be soldered, are wrapped around the tube edges to contact the electrodes 120, 121 and 122. Ceramic end caps 131, 132 are glass frit fired to the terminated patterned tube, to provide a hermetically sealed chamber, when "tipped off" or sealed. The electrolyte 105 at least partially fills the chamber, providing a gas leveling bubble 106. "Tip-off", or sealing, of the filling spout 115 completes fabrication of the electrolytic tilt sensor 100.

The glass tube vial housing 110 has three or more electrodes (patterned film on the interior surface of the vial). Electrodes 120 and 121 are coated onto the upper inner surface of glass tube 110 and are spaced apart so as to define a gap between respective opposing edges 120A and 121A. The lower electrode 122 is a common electrode. The common electrode 122 is precision patterned, substantially parallel and opposite to the working electrodes. The chamber is partially filled with an electrolyte 105, leaving the working electrodes 120, 121 at least partially immersed in the electrolyte. The portion of the cell not filled with the electrolyte defines the gaseous bubble 106, which shifts as the cell is tilted.

The electrolytic solution 105 can be selected from a group comprising non-aqueous, or semi-aqueous non-corrosive solutions. Preferably, the electrolytic solution is a non-halogenated solution, which generally has a non-deleterious effect on the nonprecious metal components of the preferred embodiment. Halogenated solutions should be used only with pure or clad precious metal components. Generally, an electrolyte is comprised of a salt capable of conducting an electrical charge and one or more solvents. The major electrolytic salts used in the electrolytes of the present invention, for example, are chosen from metal cations, such as sodium, potassium, lithium, calcium and cesium, because the ionic species of these elements offer good conductivity at every level of dilution in a wide variety of organic solvents. These cations, with controlled pH (in the range of 8 to 9), exhibit freedom from non-precious metal erosion in the promotion of organo-metallic/organic electrochemical reactions. The electrolytic salts of the present invention are also selected from anions, such as nitrate, carbonate, acetate (and other organic anions) and hydroxide, because such anions resist chemically combining with the metallic elements (iron, nickel, chromium, etc.) of the non-precious metal electrode materials. Alternatively, halogen anions such as iodide, bromide, chloride and fluoride can be employed. (Ammonium ion was also used in combination with these anions because under the electrolytic conditions of this invention, this gaseous cation does not chemically combine with the non-precious metal electrodes or with its carrier solvent.) Solvents may include methanol, ethanol, butanol, propanol, isopropanol and other higher molecular weight alcohols because these compounds favor ionic dissociation of the preferred electrolytics salts while offering enhanced wetting of the non-precious metal electrodes of the present invention. Solvents also include acetone, methylethylketone, esters, butyl carbitol, butyl cellusolve, 2-methoxyethanol and methyl carbitol because these liquids favor ionic dissociation and provide the ability to control the electrolyte's viscosity (for tilt sensing dampening) or response time control. Further, such solvents offer a variety of boiling points that, in combination, control the temperature characteristics of the specific formulated electrolyte.

As indicated above, tilting of the electrolytic tilt sensor causes the electrolyte 105 and bubble 106 to shift. Consequently of the electrodes 120, 121 become more or less immersed with the electrolyte as the bubble 106 shifts. This shift provides a change in impedance between any one 120, 121 electrode and the common electrode 122. When the tilt sensor electrodes are configured, as part of an appropriate electrical circuit, the angle of tilt may be correlated to an output voltage of the circuit.

The fundamental output of an electrolytic tilt sensor configured within an electrical circuit is an output voltage that is correlated to the tilt angle. Thus, in order for the tilt sensor to work accurately and reliably over time, all the electrical parameters of the components of the circuits, such as the applied voltage and the resistors within the circuit, must be stable over time. The resistivity of the electrolyte must remain reasonably stable in order for the output voltage to remain accurately correlated to tilt angle. Thus, it is generally desired that the resistivity of the electrolyte in a commercial tilt sensor, not vary by more than 25% over 1000 hours of usage for temperatures between –20 degrees C. and +50 degrees C. The change in the resistivity (or equivalent) of the electrolyte over time is referred to as the "load life" stability.

The tilt sensor 100 can be fabricated in a number of ways. There are, broadly, several overall steps of the fabrication procedure, each of which can be performed by alternative methods. The overall steps include formation of the containment envelope, formation of the termination pads, formation of the electrodes, filling of the containment envelope with electrolyte, sealing the containment envelope, and attachment of lead wires. The steps and their individual methods can be performed in different orders.

The containment envelope is typically fabricated by bending a glass tube to an appropriate radius and cutting the tube to a desired length. Bending the tube is typically performed at an elevated temperature at which the glass is soft. The tubing can be of any suitable diameter. By way of example, the diameter of the glass tubing typically can range from about ⅛ to 2 inches, although diameters outside this range can be used when appropriate. The radius of curvature can be typically from about 1 inch to about 8 inches, depending upon the desired application, although dimensions outside of this range can also be used when appropriate. In one embodiment, a filling spout 115 can optionally be formed in the wall of the tubing to provide means for introducing the electrolyte solution.

Figure 5A:
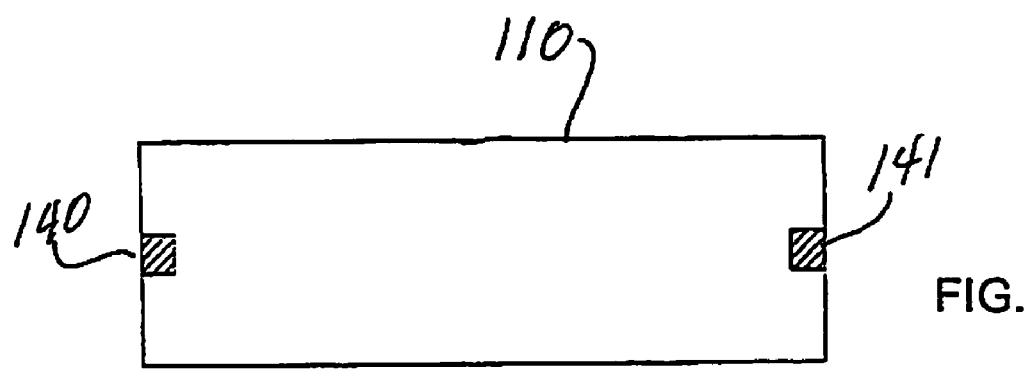
FIGS. 5A and 5B are, respectively, plan and elevational views illustrating the placement of termination pads.
Figure 5B:
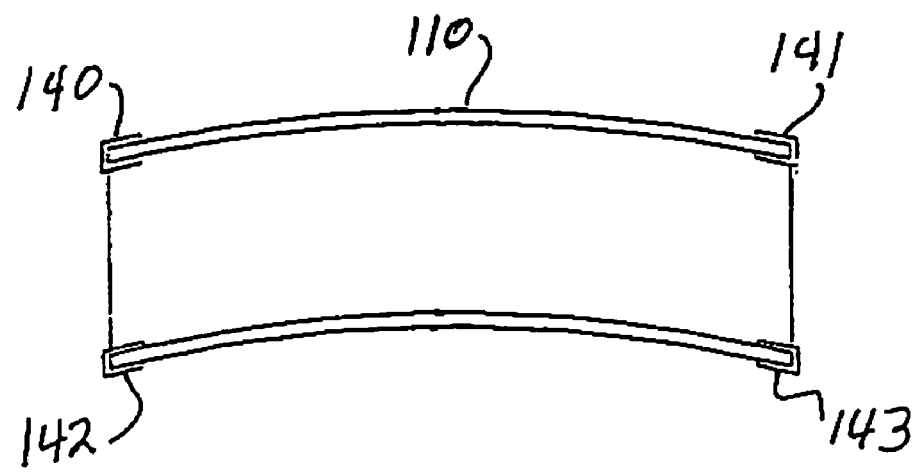

The termination pads 140, 141, 142, 143 can be fabricated by applying a silver or other precious metal frit around the edges of the cut glass tube so as to be disposed on both the exterior and interior surfaces of the containment envelope 110, as shown in FIGS. 5A and 5B.

Figure 6A:
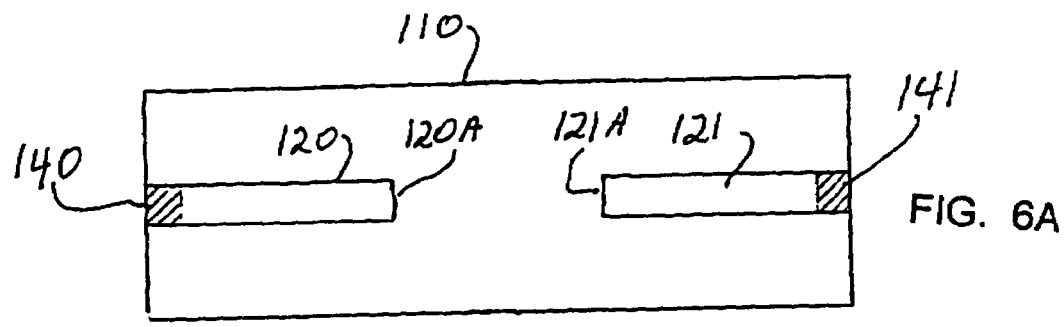
FIGS. 6A and 6B are, respectively, plan and elevational views illustrating the electrode placement in the containment vessel.
Figure 6B:
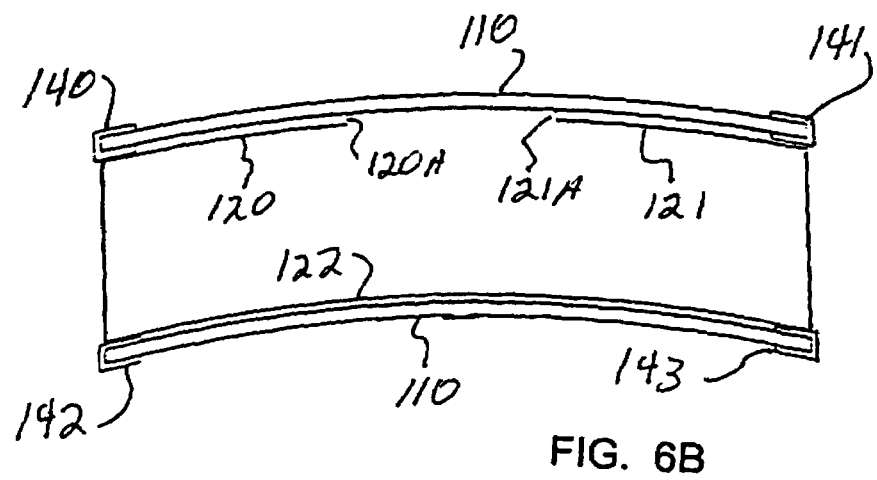
Figure 7:
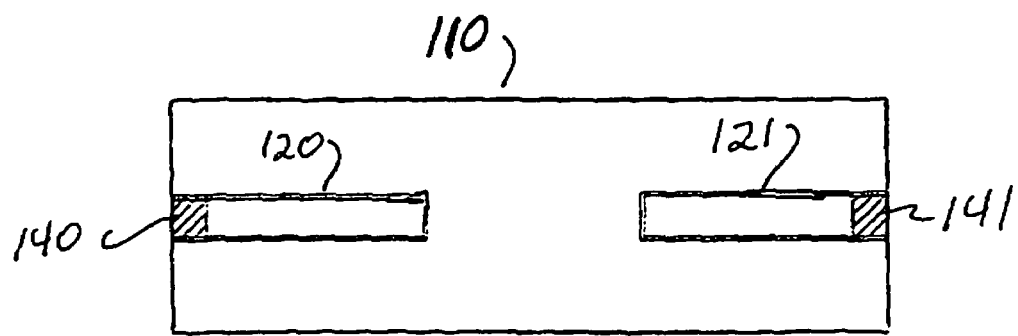
FIG. 7 is a plan view illustrating an alternative embodiment of the electrodes.

The electrodes can be fabricated in any of several alternative ways. In one embodiment a fritted glass paint containing a metal powder suitable for use as the electrode (e.g., platinum, palladium, gold, silver, nickel, chromium, and the like) is sprayed onto the interior surface of the containment envelope 100 to provide a "green coating". Also, the coated film can be prepared from precious metal organo-metallic liquid resinate compounds. By way of example, a suitable coating material is available under the designation Cermet Silver Conductor 599-E from Electric Science Laboratories, Inc. of King of Prussia, Pa., or Liquid Bright Gold available from BASF Catalysts, LLC of East Newark, N.J. Spraying can be performed with an Ivek Sonic Air spray nozzle. Optionally, the conductive coating can be applied before or after the forming of the termination pads. Alternatively, instead of spraying, the fluid coating material can be applied by filling the containment envelope and then draining. The green coating is later fired at a temperature sufficient to convert it to a conductive film which is bonded to the internal surface of the containment envelope 110. In one embodiment the fluid coating material is applied to the straight glass tubing prior to bending. Bending the tubing at an elevated temperature simultaneously fires the coating. The fired conductive film is then laser cut to form the electrodes. The first and second electrodes can be formed as flat planar strips, as shown in FIGS. 6A and 6B, or as rectangular island shaped lines laser cut from the totally coated interior surface of the containment envelope as shown in FIG. 7.

Still another alternative method for preparing the film or coating electrode, is from a glass decorative decal. These decals are prepared using coating techniques such as silk screening, offset or roto-printing, etc. processes, to provide a "green" layer of the precious metal frit or resinate coating on a carrier substrate such as paper or thin plastic sheets. The "green" film itself, can be precious metal organo-metallic resinate compounds or glass frit precious metal composites. Such a decal product is available from the Heinrich Ceramic Decal Incorporated company of 150 Goddard Drive, Worcester, Mass. The methods of application of the decal is first to cut the desired electrode shape from the large decal sheet. Thereafter, it is applied either manually or by appropriate automation, to the interior of the containment envelope. The electrode films may be cut from the decal sheet initially to an accurate electrode pattern and directly fire for the final electrode use, or roughly cut, fired and thereafter laser trimmed to an accurate electrode configuration.

Figure 8:
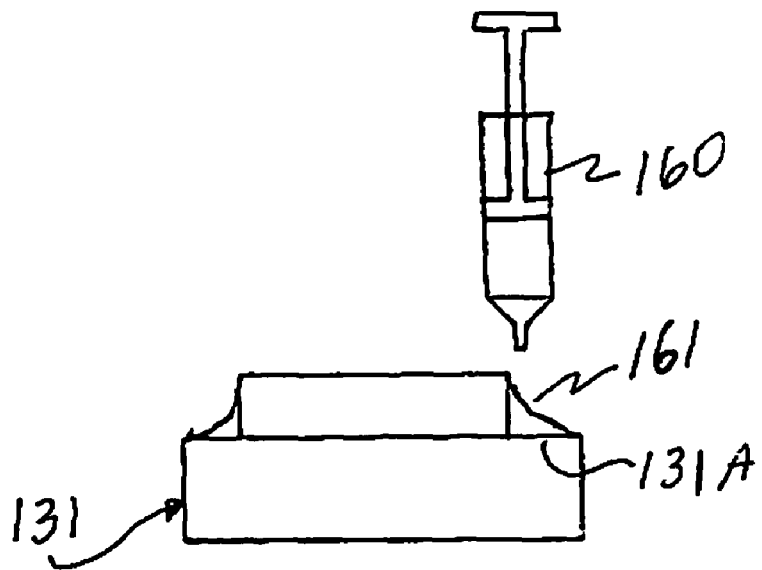
FIG. 8 is a diagrammatic illustration of the application of glass frit to an end cap.
Figure 11:
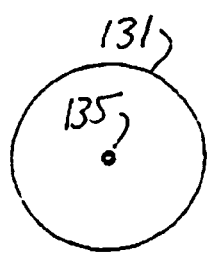
FIG. 11 is a side view showing an alternative end cap possessing a fill channel.

Referring to FIG. 8, the end caps are prepared by using an appropriate applicator 160 to apply a glass bonding frit 161 to the retaining flanges 131A. The end caps 131, 132 can be fabricated from a ceramic (e.g., alumina, aluminosilicates, refractory metal oxides such as silica, alumina, zirconia and the like, or combined oxides such as aluminosilicates) or glass. In one embodiment, as shown in FIG. 11, at least one end cap possesses a channel 135 with metallized walls through which electrolyte solution can be introduced, thereby obviating the need for forming a fill spout 115 in the glass tubing 110. In another embodiment an epoxy sealant can be used to secure the end caps to the glass tubing 110 instead of glass frit 161.

Figure 9:
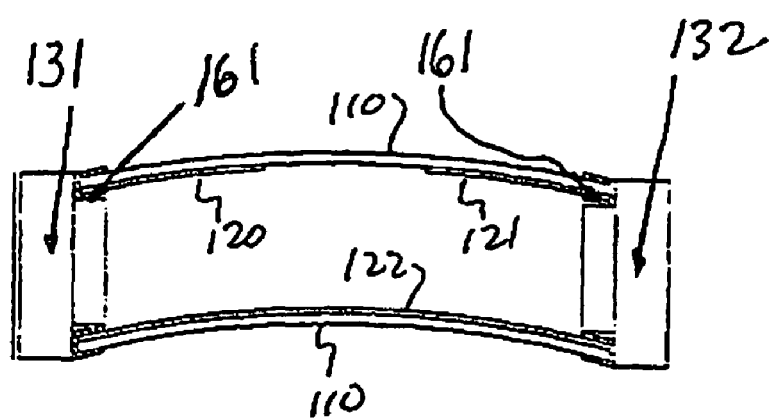
FIG. 9 illustrates the end caps joined to the glass containment vessel.

The end caps 131 and 132 are then inserted into the open ends of the glass tubing 110 as shown in FIG. 9. The assembled device is then fired at a temperature sufficient to melt or soften the glass frit to provide a hermetic seal. Firing can be performed in a conveyor belt Lear furnace or a batch Muffle furnace programmed to reach peak temperatures of from about 300 degrees C. to about 1,200 degrees C., depending on the glass system used. If epoxy sealant is used the firing step is omitted.

Figure 12:
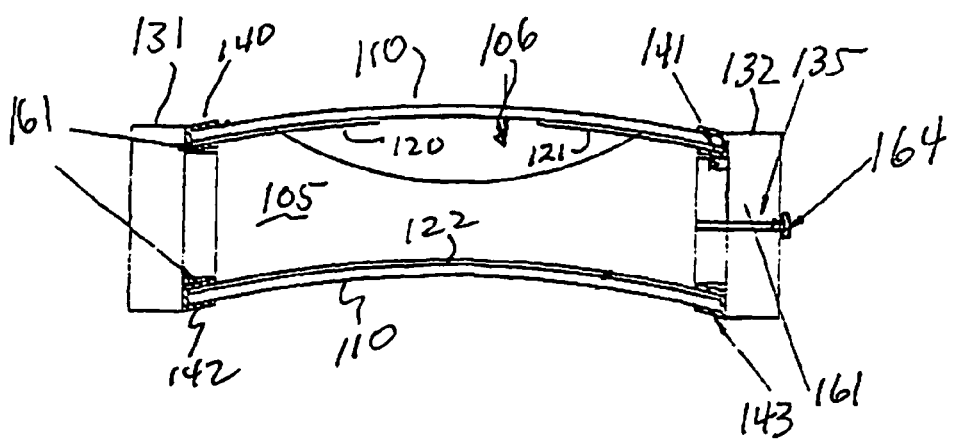
FIG. 12 illustrates the integration of an end cap having a fill channel with the tilt sensor.

Electrolyte can then be introduced through the fill spout 115 or the channel in the end cap, after which the fill spout can be sealed by a torch flame. The filled tilt sensor is optionally pre-chilled in dry ice to reduce the volatility of the electrolyte. Referring to FIGS. 11 and 12, in the event that an end cap with a fill channel 135 is employed, electrolyte is introduced through the fill channel 135 after which a plug 164 is inserted in the channel 135 and is thereafter sealed with solder, epoxy, or other suitable sealant.

Figure 10:
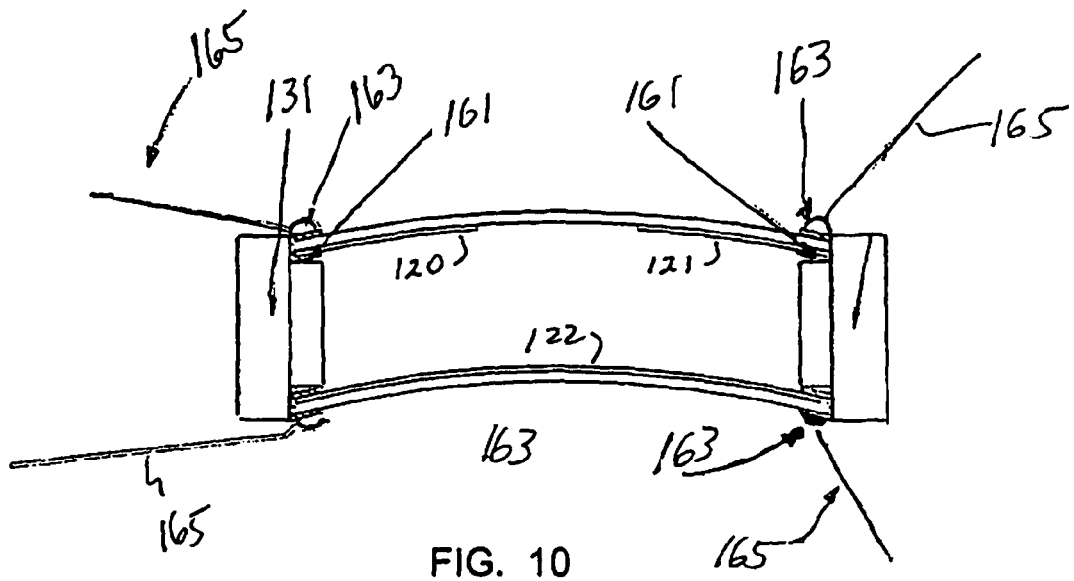
FIG. 10 illustrates the attachment of lead wires to the tilt sensor.

Next, as illustrated in FIG. 10, lead wires 165 are attached to the termination pads, for example by soldering joints 163, to provide means for incorporation of the electrolytic tilt sensor into an electrical circuit.

Example 1

An electrolytic tilt sensor of the invention having thin film gold electrodes was tested for repeatability and linearity of output over a tilt angle range of "0.25 degrees. The tilt sensor was formed to a 4 inch radius of curvature. Five runs were performed. The $r^2$ values for the linear regression analysis for each run are as follows:

| Run | $r^2$ Values |
|---|---|
| #1 | 0.999737 |
| #2 | 0.999997 |
| #3 | 0.999995 |
| #4 | 0.999998 |
| #5 | 0.999999 |

Figure 13:
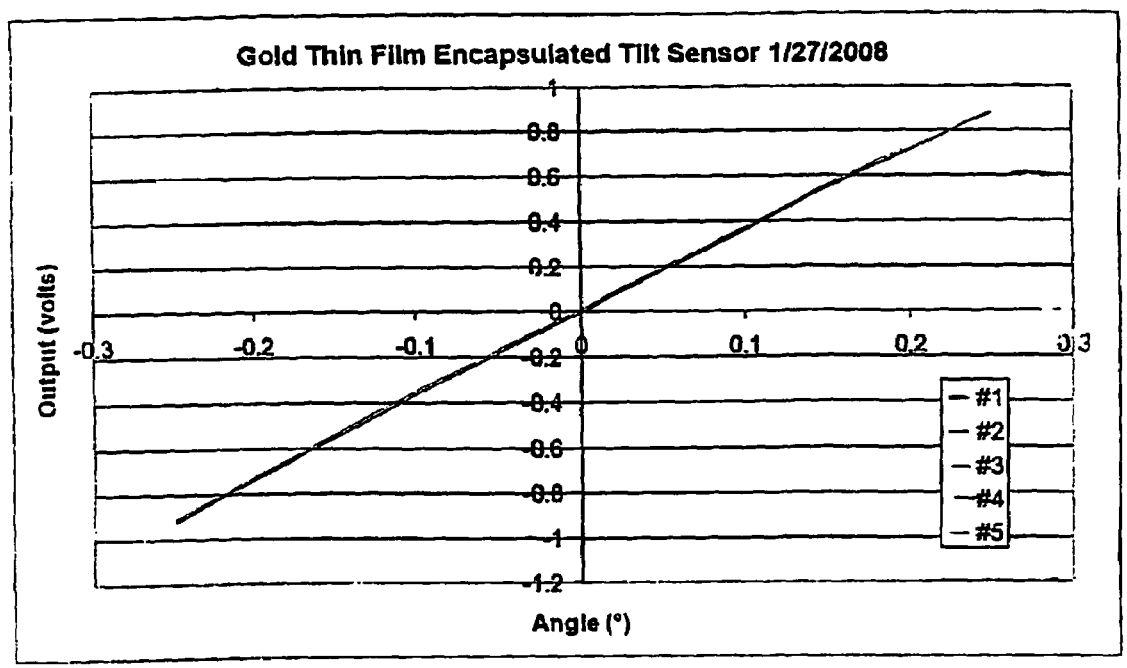
FIG. 13 is a chart showing the voltage output vs. tilt angle for various sampling runs as described in Example 1.

The output of the runs is graphically presented in FIG. 13. The plots overlie each other so as to appear as a single straight line.

Example 2

Figure 14:
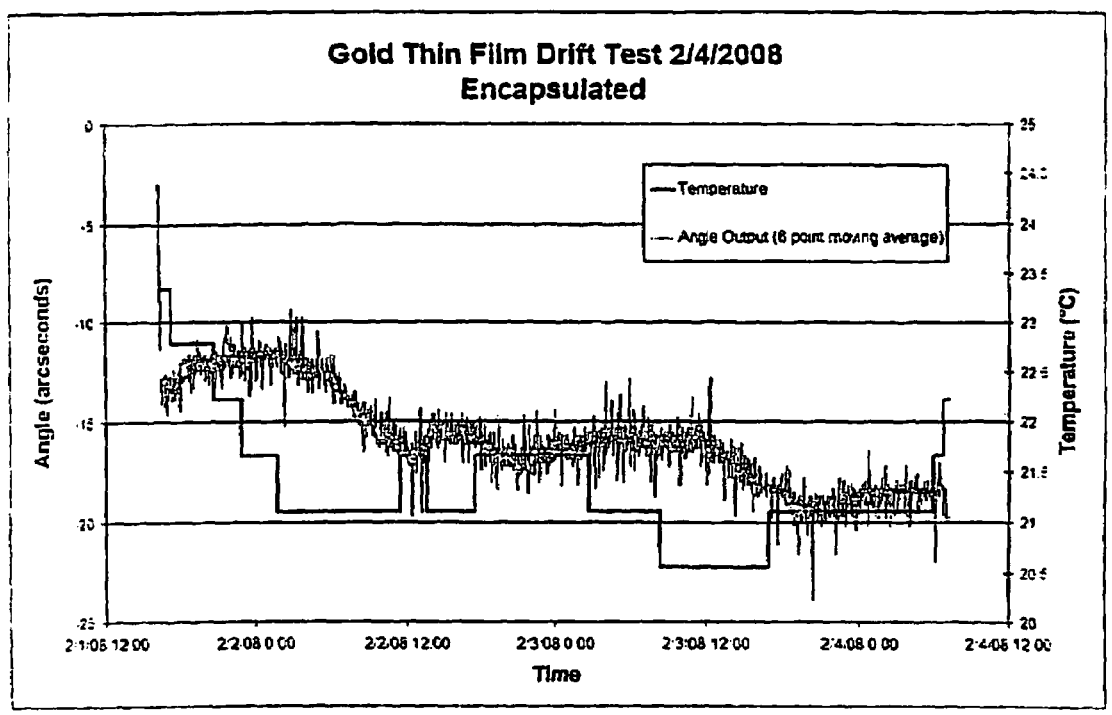
FIG. 14 is a chart showing the results of the drift test as discussed in Example 2.

The tilt sensor of Example 1 was then drift tested at null for 2.5 days. The total drift was 5 arc seconds over a temperature variation of about 2 degrees C. The results are graphically depicted in FIG. 14.

The test was conducted by placing the sensor on a stable platform. The output was then measured over time to determine the drift characteristics. The sensor is used to measure precise angles, therefore drift is an important factor in determining the quality of a sensor. A high quality sensor should exhibit little or no drift overtime.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. An electrolytic tilt sensor which comprises:
   a) a containment envelope defining an interior space, said containment envelope comprising a tubular member extending between first and second annular ends and defining a longitudinal direction therebetween, said interior space being arcuately configured in the longitudinal direction between said first and second annular ends;
   b) at least first and second electrodes disposed along, and in contact with, a curved first interior surface portion of the containment envelope, said first interior surface portion being concave in the longitudinal direction, and said first and second electrodes being longitudinally spaced apart from each other to define a gap between respective opposing edges of the first and second electrodes;
   c) at least a third electrode disposed along and in contact with a curved second interior surface portion of the containment envelope opposite said first interior surface portion, said second interior surface portion being convex in the longitudinal direction;
   d) an electrolyte solution at least partially filling the interior space of the containment envelope to provide a bubble;
   wherein said containment envelope is hermetically sealed.
2. The electrolytic tilt sensor of claim 1 wherein the containment envelope comprises a curved glass tube.
3. The electrolytic tilt sensor of claim 1 wherein the first, second and third electrodes are coated onto the respective interior surface portions of the containment envelope.
4. The electrolytic tilt sensor of claim 1 wherein the first, second and third electrodes are fabricated from metals selected from the group consisting of platinum, palladium, iridium, ruthenium, osmium, rhodium, gold, silver, nickel, chromium, iron, alloys containing same and physical combinations thereof.
5. The electrolytic tilt sensor of claim 1 wherein the first, second and third electrodes are shaped by laser cutting.
6. The electrolytic tilt sensor of claim 1 wherein the electrolyte solution includes one or more cations of sodium, potassium, lithium, cesium and/or calcium, one or more anions of nitrate, carbonate, acetate and/or hydroxide, halogen, and one or more solvents including methanol, ethanol, butanol, propanol, isopropanol, acetone, methylethylketone, esters, butyl carbitol, butyl cellusolve, 2-methoxyethanol and/or methyl carbitol.
7. The electrolytic tilt sensor of claim 1 wherein the containment envelope comprises at least one end cap engaged at and sealing at least one annular end of the containment envelope and affixed thereto with glass frit.
8. The electrolytic tilt sensor of claim 1 further including a plurality of conductive termination pads disposed around respective edges of the containment envelope and being in electrical contact with respective electrodes and providing means exterior to the containment envelope for electrical contact with an electrical circuit.
9. The electrolytic tilt sensor of claim 1 wherein the containment envelope includes a filling spout.
10. The electrolytic tilt sensor of claim 7 wherein the at least one end cap includes a channel for the introduction of electrolyte into the containment envelope.
11. A method for making an electrolytic tilt sensor comprising the steps of:
    a) forming a containment envelope having an arcuate shape, by heating and axially bending a glass tube to a predetermined radius of curvature;
    b) attaching termination pads to respective edges of the containment vessel;
    c) disposing at least first and second electrodes along, and in contact with, a first interior surface portion of the containment envelope, said first and second electrodes being spaced apart from each other to define a gap between respective opposing edges of the first and second electrodes;
    d) disposing at least a third electrode along and in contact with a second interior surface portion of the containment envelope opposite said first interior surface portion;
    e) at least partially filling the containment envelope with an electrolyte solution to provide a gaseous bubble therein;
    f) sealing the containment envelope.
12. The method of claim 11 wherein the step (b) of attaching the termination pads comprises applying a frit of silver, gold, platinum, palladium, iridium, ruthenium, osmium, rhodium, or alloy thereof to edges of the containment vessel so as to overlap both exterior and interior surfaces of the containment vessel.
13. The method of claim 11 wherein the step (c) of disposing the first and second electrodes along the interior surface portion of the containment envelope comprises spraying a flitted glass paint containing a conductive metal to the interior surface of the containment envelope to provide a green coating, firing followed by laser cutting the coating to a desired shape, and firing the coating to provide the first and second conductive electrodes bonded to the containment envelope.

14. The method of claim 11 wherein the step (c) of disposing the first and second electrodes along the interior surface portion of the containment envelope comprises applying a rough shaped precious metal glass decal to the interior surface portion, firing, and laser trimming to form a more precisely shaped electrode.

15. The method of claim 11 wherein the step (c) of disposing the first and second electrodes along the interior surface portion of the containment envelope comprises applying a precisely shaped precious metal glass decal to the interior surface portion, and firing to form a precisely shaped electrode.

16. The method of claim 13 wherein the first and second electrodes are cut to form planar strips spaced apart from each other to define a gap between respective opposing edges of the first and second electrodes.

17. The method of claim 13 wherein the interior surface of the containment envelope is totally coated and the first and second electrodes are formed as rectangular island-shaped lines laser cut from the totally coated interior containment envelope.

18. The method of claim 11 wherein the step (c) of disposing the first and second electrodes along the interior surface of the containment envelope comprises filling the containment envelope with fritted glass paint containing a conductive metal, then draining the paint to provide a green coating, cutting the coating to a desired shape, and firing the coating to provide the first and second conductive electrodes bonded to the containment vessel.

19. The method of claim 18 wherein the first and second electrodes are cut to form planar strips spaced apart from each other to define a gap between respective opposing edges of the first and second electrodes.

20. The method of claim 18 wherein the interior surface of the containment envelope is totally coated and the first and second electrodes are formed as rectangular island-shaped lines laser cut from the totally coated interior containment envelope.

21. The method of claim 11 wherein the containment envelope has a pour spout and the step (e) of partially filling the containment envelope comprises introducing the electrolyte through the pour spout, and thereafter sealing the pour spout.

22. The method of claim 11 wherein the tilt sensor includes at least one end cap.

23. The method of claim 20 wherein the at least one end cap includes a fill channel and the step (e) of partially filling the containment envelope comprises introducing the electrolyte through the fill channel, then plugging the fill channel.

24. The method of claim 11 wherein sealing the containment envelope comprises securing fritted end caps to open ends of the glass envelope, then firing the tilt sensor to melt or soften the frit to provide a sealed joint.

25. The method of claim 11 further comprising attaching electrical lead wires to respective termination pads.

\* \* \* \* \*